US010486733B2

(12) United States Patent
Moujoud (10) Patent No.: US 10,486,733 B2
(45) Date of Patent: Nov. 26, 2019

(54) FOOT-OPERATED PERSONAL VEHICLE

(71) Applicant: Aissam Moujoud, Poitiers (FR)

(72) Inventor: Aissam Moujoud, Poitiers (FR)

( * ) Notice: Subject to any disclaimer, the term of this patent is extended or adjusted under 35 U.S.C. 154(b) by 0 days.

(21) Appl. No.: 15/310,919

(22) PCT Filed: May 13, 2015

(86) PCT No.: PCT/FR2015/051271
§ 371 (c)(1),
(2) Date: Nov. 14, 2016

(87) PCT Pub. No.: WO2015/173523
PCT Pub. Date: Nov. 19, 2015

(65) Prior Publication Data
US 2017/0072989 A1    Mar. 16, 2017

(30) Foreign Application Priority Data

May 14, 2014   (FR) ...................... 14 54269

(51) Int. Cl.
*B62D 1/22*      (2006.01)
*B62K 5/007*    (2013.01)
(Continued)

(52) U.S. Cl.
CPC ................. *B62D 1/22* (2013.01); *B62D 7/16* (2013.01); *B62D 27/04* (2013.01); *B62D 31/006* (2013.01);
(Continued)

(58) Field of Classification Search
CPC .......... A61G 5/00; A61G 5/023; A61G 5/025; A61G 5/121; A61G 5/125; A61G 5/128;
(Continued)

(56) References Cited

U.S. PATENT DOCUMENTS 883,371 A      3/1908  Young
2,578,828 A  * 12/1951  Nelson ..................... A61G 5/00
                                                                    280/250.1
(Continued)

FOREIGN PATENT DOCUMENTS

BE       1015829 A3    9/2005
CN     200942838 Y     9/2007
(Continued)

OTHER PUBLICATIONS

International Search Report, dated Aug. 6, 2015, from corresponding PCT Application.

*Primary Examiner* — Joseph M Rocca
*Assistant Examiner* — Marlon A Arce
(74) *Attorney, Agent, or Firm* — Young & Thompson (57) ABSTRACT

Disclosed is a foot-operated private vehicle, the vehicle including a chassis that extends heightwise along a vertical axis, the vehicle also including a front set of wheels mounted at the front of this chassis, a rear set of wheels mounted at the rear of this chassis, and a unit for controlling the speed and direction of the vehicle, taking the form of a right-hand pedal and a left-hand pedal, the private vehicle being characterized in that at least one pedal, known as the steering pedal, is mounted in a rotatable manner with respect to the chassis about a pivot axis parallel to the vertical axis of the chassis of the vehicle, a rotation of this steering pedal about its pivot axis being used to control the direction of the vehicle.

20 Claims, 6 Drawing Sheets

(51) Int. Cl.
- *B62K 5/08* (2006.01)
- *B62D 7/16* (2006.01)
- *B62D 27/04* (2006.01)
- *B62D 31/00* (2006.01)
- B62K 23/06 (2006.01)
- A61G 5/00 (2006.01)
- B62D 1/02 (2006.01)
- A61G 5/10 (2006.01)
- B62K 5/05 (2013.01)
- A61G 5/12 (2006.01)
- A61G 5/02 (2006.01)
- B62K 5/01 (2013.01)

(52) U.S. Cl.
CPC ............ *B62K 5/007* (2013.01); *B62K 5/08* (2013.01); *A61G 5/00* (2013.01); *A61G 5/023* (2013.01); *A61G 5/025* (2013.01); *A61G 5/1051* (2016.11); *A61G 5/121* (2016.11); *A61G 5/125* (2016.11); *A61G 5/128* (2016.11); *B62D 1/02* (2013.01); *B62K 5/01* (2013.01); *B62K 5/05* (2013.01); *B62K 23/06* (2013.01)

(58) Field of Classification Search
CPC ........ A61G 5/1051; B62K 5/007; B62K 5/01; B62K 5/05; B62K 5/08; B62K 5/10; B62K 23/06; B62K 23/08; B62K 21/00; B62D 1/02; B62D 1/22; B62D 7/16; B62D 7/20; B62D 9/00; B62D 9/02; B62D 61/04; B62D 27/04; B62D 31/006
USPC .......................................................... 74/560
See application file for complete search history.

(56) References Cited

U.S. PATENT DOCUMENTS

| | | | |
|---|---|---|---|
| 4,020,916 A | 5/1977 | Noble | |
| 5,354,083 A * | 10/1994 | Liu | B62M 1/20 |
| | | | 280/224 |
| 6,845,829 B2 | 1/2005 | Hafendorfer | |
| 7,946,963 B1 * | 5/2011 | Schreiner | A63B 21/153 |
| | | | 280/217 |
| 2003/0213626 A1 * | 11/2003 | Hafendorfer | B62D 1/02 |
| | | | 180/6.48 |
| 2008/0190682 A1 * | 8/2008 | Mahy | A61G 5/046 |
| | | | 180/209 |
| 2008/0191452 A1 * | 8/2008 | Easton | A61G 5/045 |
| | | | 280/650 |
| 2010/0059303 A1 * | 3/2010 | Paolacci | A61G 3/061 |
| | | | 180/253 |
| 2010/0065346 A1 * | 3/2010 | Porcheron | A61G 5/046 |
| | | | 180/6.24 |
| 2010/0181124 A1 | 7/2010 | Wang | |
| 2012/0210820 A1 * | 8/2012 | Elshorbagy | B60T 7/06 |
| | | | 74/513 |
| 2015/0137468 A1 * | 5/2015 | Katoh | B62D 1/02 |
| | | | 280/87.1 |
| 2015/0158534 A1 * | 6/2015 | Jackson | B62D 31/006 |
| | | | 180/6.5 |
| 2016/0089283 A1 * | 3/2016 | DeLuca | A61G 1/0243 |
| | | | 180/413 |

FOREIGN PATENT DOCUMENTS

| | | | | |
|---|---|---|---|---|
| CN | 202608981 U | 12/2012 | | |
| EP | 1627619 A2 * | 2/2006 | ............ | A61B 5/02 |
| GB | 1 501 731 A1 | 2/1978 | | |
| TW | I 362 258 B | 4/2012 | | |

* cited by examiner

FOOT-OPERATED PERSONAL VEHICLE

This invention relates to a personal vehicle, also sometimes called a personal transport.

Personal vehicle is defined as a compact vehicle, designed to make the travel of a single individual faster and less tiring.

Incidentally, such a personal vehicle can also be used to transport another individual.

BACKGROUND OF THE INVENTION

Among the personal vehicles already sold on the market, those belonging to the self-balancing scooter family stand out.

These self-balancing scooters get their name from the fact that they use a gyroscopic stabilization system that makes it possible for their users to control the travel speed of the vehicle and its travel direction dynamically.

For the user, this dynamic control consists simply in moving its center of gravity toward the front to move the vehicle forward, to the rear to slow it down, and to the right or to the left when it is desired to head in one of its two directions.

Self-balancing scooters that are known and actually available on the market are sold under the brand names SEGMAY®, EWEE®, and ROBIN-M1®.

These three self-balancing scooters comprise two wheels that are motorized and mounted on either side of a platform on which the user stands upright and a driving column that extends from the platform and offers handlebars for the user at its upper end.

According to one drawback, the hands of the user are not free when he travels using one of these self-balancing scooters.

Actually, so as not to tip over and run the risk of falling violently on the ground, the user must necessarily grip the driving column by the handlebars.

In the best case, when using these self-balancing scooters, only the most expert users can hold them with one hand and perform an action or transport an object with the other hand.

Also, there are other personal vehicles that are similar to self-balancing scooters but that free the user's hands during travel.

For example, the TOYOTA® Company developed a self-balancing scooter under the name WINGLET® also taking the form of a platform with two motorized side wheels and on which the user stands upright.

However, unlike preceding self-balancing scooters, the driving column of the self-balancing scooter WINGLET® is replaced by two arms extending from the center of the platform and offering at their upper ends two supports for the user's legs, the two supports being located approximately at the height of the user's calves.

Thus, when using the self-balancing scooter WINGLET®, the user must clamp the two supports between his legs to stand upright balanced on the platform.

Although making it possible to free up the user's hands, the fact of having to clamp the supports between the legs can be tiring for the users, in particular on long trips.

Finally, in a general manner, and despite the performances of the new gyroscopic stabilization systems, all of the self-balancing scooters with side wheels similar to those that were just cited do not have absolute stability relative to pitching movements, i.e., rocking movements from front to back or from back to front, which can be caused by a driving error of the user or by an obstacle on the ground.

In addition, when the user transports an object by standing upright on such self-balancing scooters, his driving is disrupted by the weight of the object that he is transporting.

Actually, the transported object changes the center of gravity of the user, who should therefore adapt his driving to the weight of the object that he is transporting.

In parallel, the HONDA® Company developed a personal vehicle that bears the name of Uni-Cub® and that drives like a self-balancing scooter by moving its center of gravity.

However, unlike the vehicles described above, the Uni-Cub® comprises a saddle and side pedals making it possible for the user to ride in the seated position.

In addition, instead of two side wheels, the Uni-Cub® comprises a large center wheel whose tire tread consists of a multitude of transverse wheels arranged radially around the axis of rotation of the center wheel, as well as a transverse rear wheel whose axis of rotation is perpendicular to that of the center wheel and parallel to the front-rear direction of the vehicle.

If this arrangement of the wheels improves the stability of the vehicle relative to pitching movements, it reduces this stability relative to the rolling movements, i.e., the rocking movements from left to right and from right to left.

Finally, and although more comfortable, the seated position reduces the view and the access height of the user, which can turn out to be problematic for travel in the middle of a crowd, or in situations in which the user must stand to accomplish an action with his hands or to pick up an object.

Also, there are other personal vehicles that offer more stability thanks to a four-wheel design and that preserve the view and the access height of the user thanks to a half-seated half-standing driving position.

Such a vehicle is described in the application U.S. Pat. No. 6,845,829.

So as to free the user's hands, the personal vehicle described in this application U.S. Pat. No. 6,845,829 comprises rotating pedals that make it possible to guide the vehicle in a direction and to control its speed with the feet.

More specifically, two right and left pedals make it possible to control the speed of rotation of the shafts of two motors that independently drive the right and left rear wheels of the vehicle.

These two pedals are mounted to rotate on either side of the vehicle's chassis and around shafts perpendicular to the front-rear direction of the vehicle.

To control the vehicle in speed, the user makes the two pedals turn together with his feet toward the front or toward the rear, and to guide it in a direction, the user makes the two pedals turn differently from one another so that the two rear wheels have different rotating speeds, with the vehicle being directed from the side that is opposite to that of the wheel that turns the fastest.

Although relatively simple on the theoretical plane, the guiding of the vehicle described in the application U.S. Pat. No. 6,845,829 requires a certain dexterity and does not offer intuitive driving.

Actually, few people are naturally accustomed to guiding a vehicle in a direction by actuating two pedals or two levers simultaneously but in a different manner.

According to another drawback, the pedals of the vehicle described in the application U.S. Pat. No. 6,845,829 are located under the vehicle seat and in the vertical axis of this seat, supporting plates being provided at the front of the vehicle's chassis and at mid-height between the pedals and the seat for the user's knees.

This positioning of the pedals imparts a driving position that promotes the tilting of the top of the user's body toward the front, in particular during a deceleration of the vehicle.

Also, to remedy this drawback, the document U.S. Pat. No. 6,845,829 provides a railing that surrounds the user's waist.

However, this railing turns out to be uncomfortable, and it prevents the user from quickly getting on and off the vehicle, which can be problematic within the framework of professional use.

SUMMARY OF THE INVENTION

The purpose of this invention is to eliminate the drawbacks of the prior art.

For this purpose, the invention has as its object a foot-operated personal vehicle, with the vehicle comprising a chassis that extends in length along a longitudinal axis, in width along a transverse axis, and in height along a vertical axis, with the vehicle also comprising a front set of wheels mounted at the front of this chassis, a rear set of wheels mounted at the rear of this chassis, a seat mounted on this chassis, at least one motor that makes it possible to drive in rotation at least one wheel of a set of wheels, feeding means of this motor, and means for controlling the vehicle in speed and for guiding it in a direction, taking the form of two right and left pedals, each pedal comprising a surface for accommodating a user's foot, and at least one pedal, a so-called speed pedal, being mounted to rotate in relation to the chassis around a tilting axis that is perpendicular to the vertical axis of the vehicle's chassis, a rotation of this speed pedal around its tilting axis being used to control the vehicle in speed.

According to the invention, the personal vehicle is characterized in that at least one pedal, a so-called guide pedal, is mounted to rotate in relation to the chassis around a pivoting axis that is parallel to the vertical axis of the vehicle's chassis, a rotation of this guide pedal around its pivoting axis being used to guide the vehicle in a direction.

However, in a preferred variant embodiment of the control means of the personal vehicle, the two right and left pedals are guide pedals, with these two right and left guide pedals being mounted to rotate in relation to the chassis respectively around right and left pivoting axes that are parallel to the vertical axis of the vehicle's chassis, and simultaneous rotations of these two right and left guide pedals around their right and left pivoting axes being used to guide the vehicle in a direction.

Therefore, the driving of the personal vehicle in a direction according to the invention is accomplished by a twisting movement imposed on the guide pedal or pedals, with this twisting movement consisting in a rotation of a pedal from right to left around an essentially vertical axis.

Advantageously, this twisting movement of the guide pedal or pedals imparts to the vehicle a more natural driving action for the user.

In addition, with the two pedals being linked mechanically in such a way as to pivot simultaneously and by the same angle around their respective pivoting axes, the direction-guiding means of the personal vehicle according to the invention do not require any particular ability. Therefore, since the personal vehicle according to the invention offers a guiding in the intuitive direction, it can be easily used by the majority of users.

Always for the purpose of facilitating the use of the personal vehicle according to the invention, a rotation of the right pedal around its right tilting axis is used to increase the speed of the vehicle, and a rotation of the left pedal around its left tilting axis is used to reduce the vehicle's speed.

Actually, these pitching movements of the pedals, i.e., the rotation from front to rear around an essentially horizontal axis, are well known to users for controlling the acceleration and the braking of ordinary vehicles such as automobiles.

According to another advantageous characteristic of the design of the means for guiding in a direction and controlling the speed of the personal vehicle according to the invention, the two right and left pedals are mounted at the front of the vehicle's chassis, with the seat being located in the central position in the length and in the width of the vehicle's chassis.

More specifically, the pedals are mounted side by side on the vehicle's chassis, between the two right and left wheels of the front set of wheels.

This positioning of the pedals in front of the seat makes it possible for the user to be held in a seated-standing position with the legs forward, this driving position improving the comfort and the stability of the vehicle's user.

In addition, with this legs-forward driving position making it possible for the user to better withstand the kinetic energy that pushes his body forward every time the vehicle decelerates, the use of a railing encircling the user and preventing the user from getting in and out of the vehicle quickly is avoided.

BRIEF DESCRIPTION OF THE DRAWINGS

Other characteristics and advantages will emerge from the following description of the invention, a description that is provided only by way of example, relative to the accompanying drawings, in which.

DETAILED DESCRIPTION OF THE PREFERRED EMBODIMENTS

Figures 1, 2:
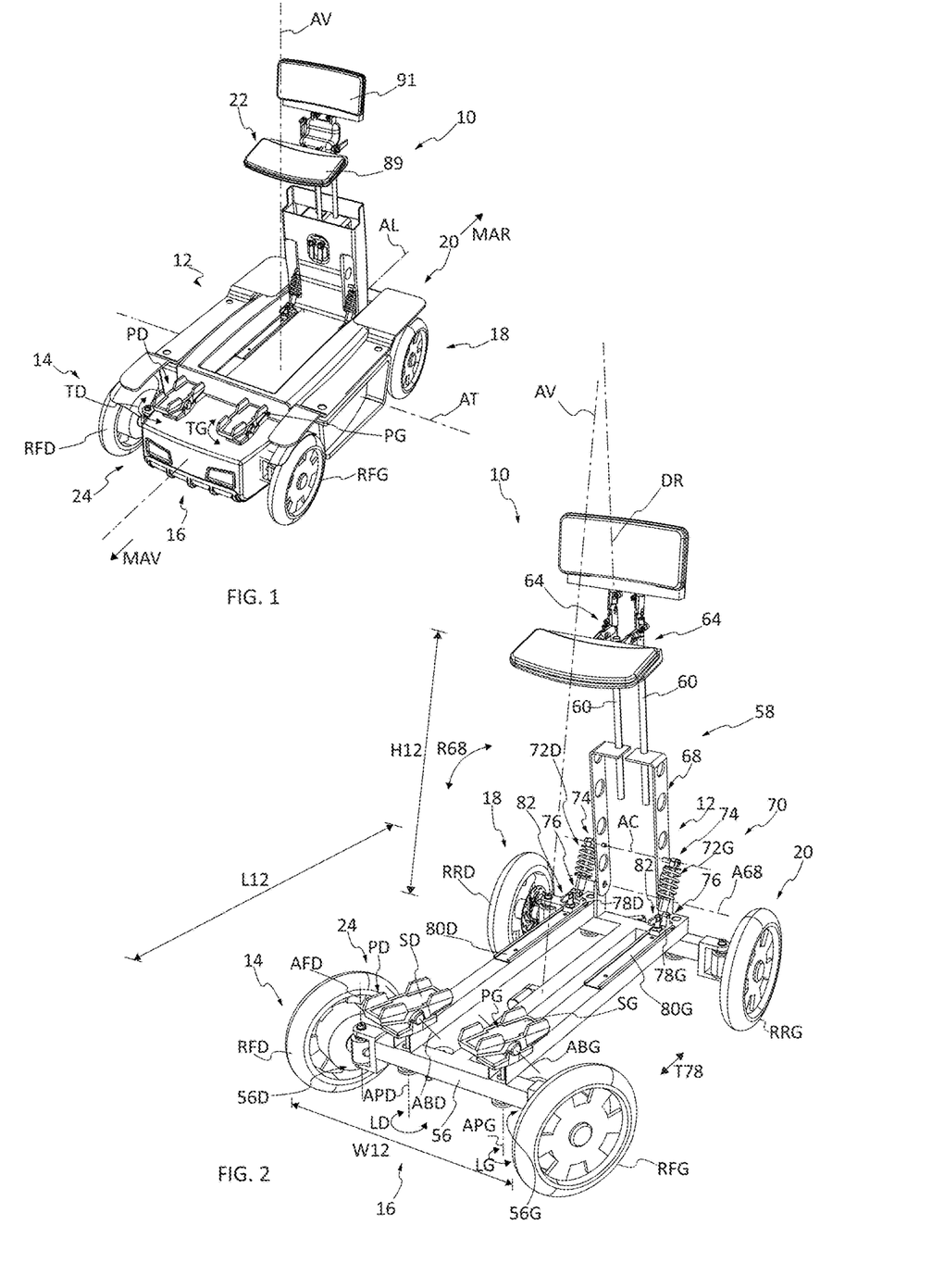
FIG. 1 is a perspective view of the personal vehicle according to the invention, with a first variant of its chassis.
FIG. 2 is a stripped-down perspective view of the personal vehicle according to the invention, with a first variant of its chassis.
Figure 3:
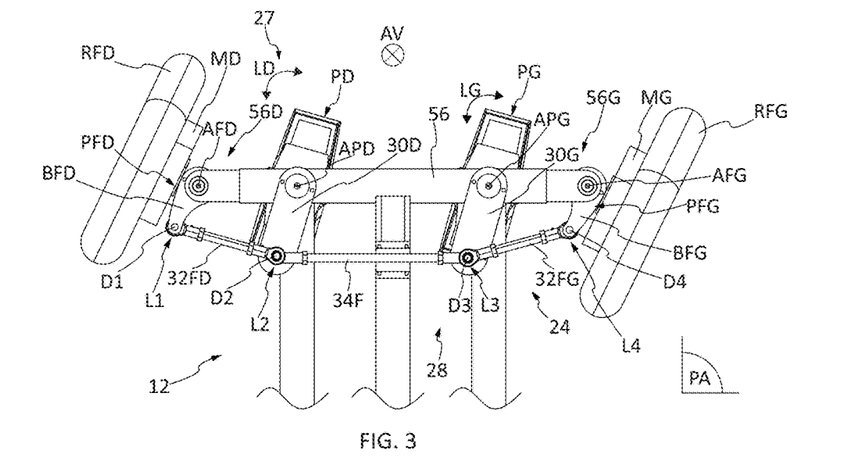
FIG. 3 is a bottom and detail view of a first variant of the directional means of the personal vehicle according to the invention, with a first variant of its chassis.
Figure 5:
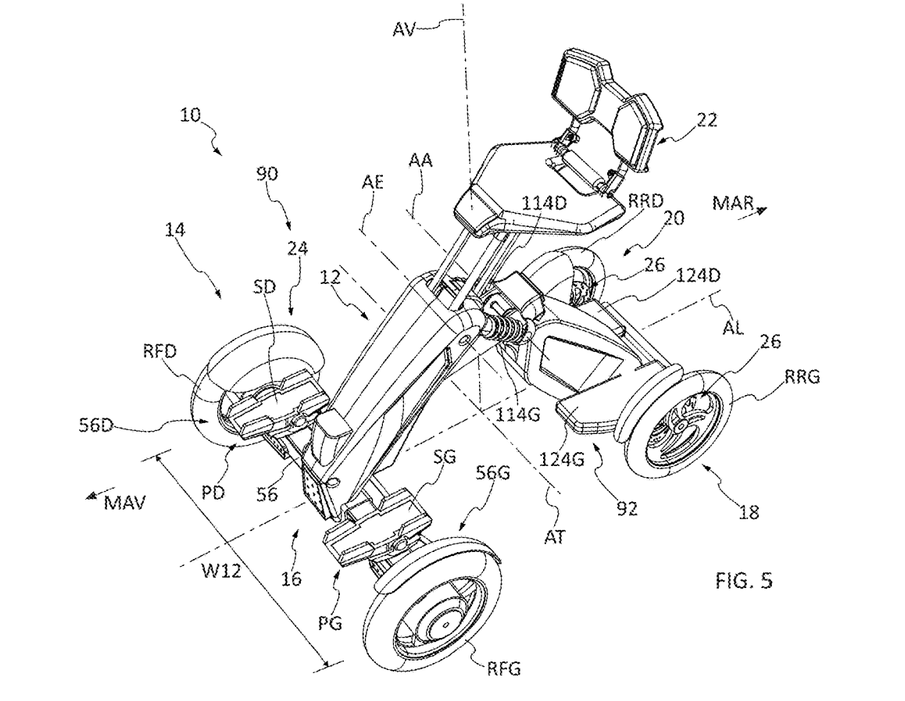
FIG. 5 is a perspective view of the personal vehicle according to the invention, with a second variant of its deployed chassis.

As FIGS. 1 and 5 illustrate, this invention relates to a foot-operated personal vehicle 10.

By foot-operated, the invention means that the user controls the vehicle 10 in speed and guides it in a direction solely with his feet.

Actually, one essential objective of this invention is to make it possible for a user to move easily and quickly without having his hands occupied by the vehicle's guiding means.

As can be seen in FIGS. 1, 2, 5 and 6, this personal vehicle 10 comprises a chassis 12 that extends in length L12 along a longitudinal axis AL, in width W12 along a transverse axis AT, and in height H12 along a vertical axis AV.

The longitudinal axis AL, the transverse axis AT, and the vertical axis AV are perpendicular, and they form an orthonormed reference point.

The personal vehicle 10 also comprises a front set 14 of wheels mounted at the front 16 of the chassis 12 and a rear set 18 of wheels mounted at the rear 20 of this chassis 12.

In a preferred embodiment of the invention, the front set 14 of wheels comprises two right front RFD and left front RFG wheels, and the rear set 18 of wheels comprises two right rear RRD and left rear RRG wheels.

This four-wheel design promotes the stability of the vehicle 10, in particular upon stopping and when making turns, and the four wheels of the vehicle 10 also make it possible to clear obstacles such as curbs or steps.

For the user's comfort, the personal vehicle 10 also comprises a seat 22 that is mounted on this chassis 12.

Figures 8, 9:
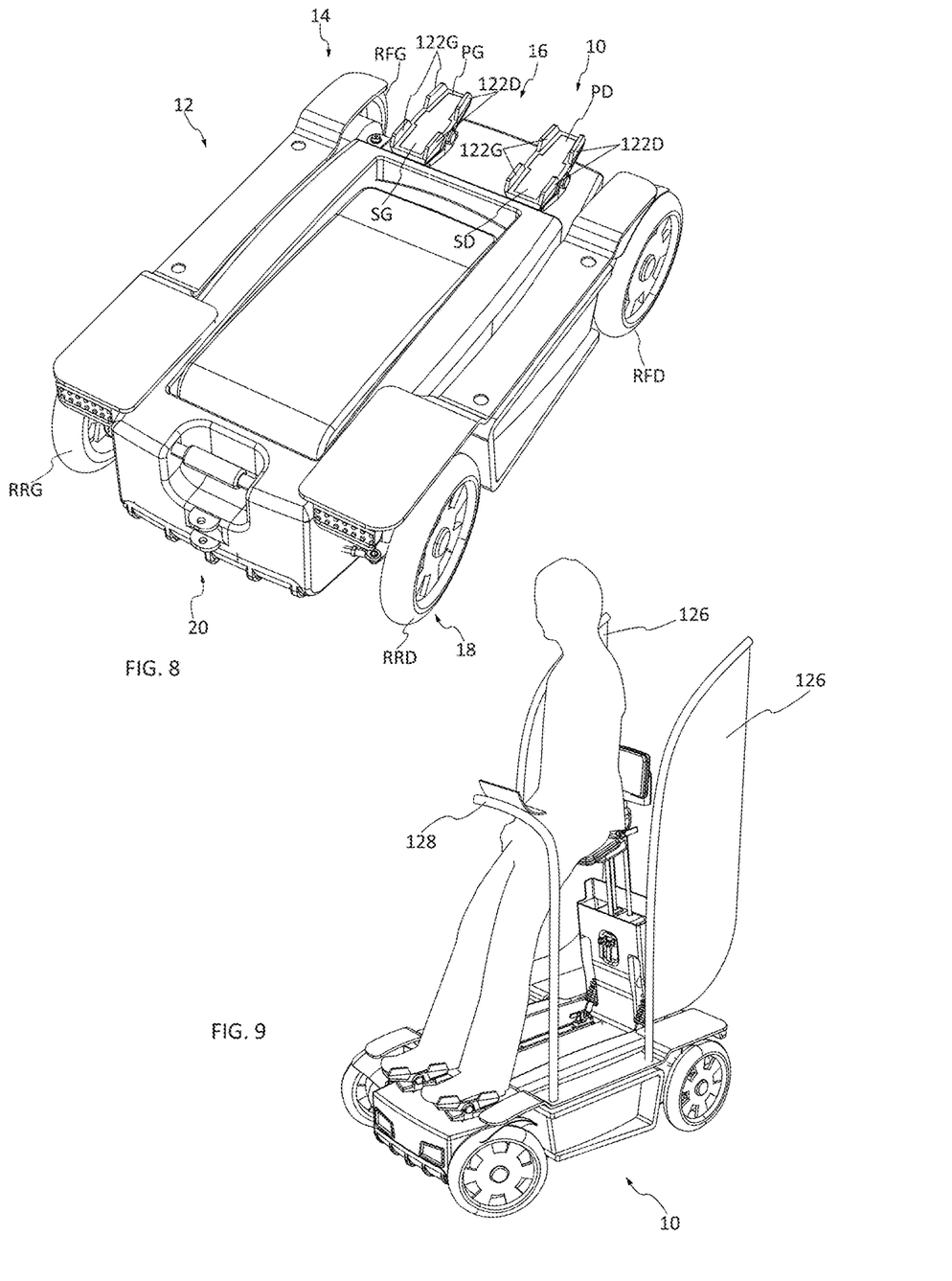
FIG. 8 is a perspective view of the personal vehicle according to the invention, with a first variant of its chassis, and with its seat folded.
FIG. 9 is a perspective view of the personal vehicle according to the invention, with different advertising equipment that is useful for tourism application.

In more detail, this seat 22 is mounted on the chassis 12 in such a way as to allow a user to be installed in a half-sitting half-standing driving position on the vehicle 10, as FIG. 9 illustrates.

Next, the personal vehicle 10 comprises at least one motor making it possible to drive in rotation at least one wheel of a set 14, 18 of wheels, and feeding means of this motor.

In a preferred embodiment of the invention, the hub of each of the two right front RFD and left front RFG wheels comprises an electrical drive MD, MG fed by a storage battery on board the vehicle 10. This battery is not visible in the figures, but it is preferably attached to an element of the chassis 12 of the vehicle and protected by a cover.

Finally, the personal vehicle 10 according to the invention comprises means 24 for controlling the vehicle in speed and guiding it in a direction.

These controlling means 24 take the form of two right PD and left PG pedals, each pedal PD, PG comprising a surface SD, SG for accommodating a user's foot.

At least one pedal, a so-called speed pedal, is mounted to rotate in relation to the chassis 12 around a tilting axis that is essentially perpendicular to the vertical axis AV of the chassis 12 of the vehicle 10, with a rotation of this speed pedal around its tilting axis being used to control the vehicle 10 in speed.

For example, a tilting of a pedal toward the front is used to increase the speed and a tilting of this pedal toward the rear makes it possible to reduce the speed of the vehicle.

However, in a preferred embodiment of the invention, the two right PD and left PG pedals are speed pedals, with these two right PD and left PG speed pedals being mounted in rotation TD, TG in relation to the chassis 12 respectively around right tilting ABD and left tilting ABG axes that are essentially perpendicular to the vertical axis AV of the chassis 12 of the vehicle 10, a rotation TD of the right pedal PD around its right tilting axis ABD being used for increasing the speed of the vehicle 10, and a rotation TG of the left pedal PG around its left tilting axis ABG being used to reduce the speed of the vehicle 10.

More specifically, a tilting of the right pedal PD toward the front is used for increasing the forward speed MAV of the vehicle 10 and a tilting of the left pedal PG toward the front is used to reduce the forward speed MAV of the vehicle 10.

In addition, and when the vehicle 10 is stopped, a tilting of the right pedal PD toward the rear is used to increase the reverse speed MAR of the vehicle 10.

As indicated above, these pitching movements of the pedals PD and PG, i.e., the front-to-rear rotation TD and TG around the tilting axes ABD and ABG that are essentially horizontal, are known and used by a large number of users for controlling the acceleration and the braking of more ordinary vehicles such as automobiles. Therefore, the speed of the personal vehicle according to the invention is easily controlled.

Figure 6:
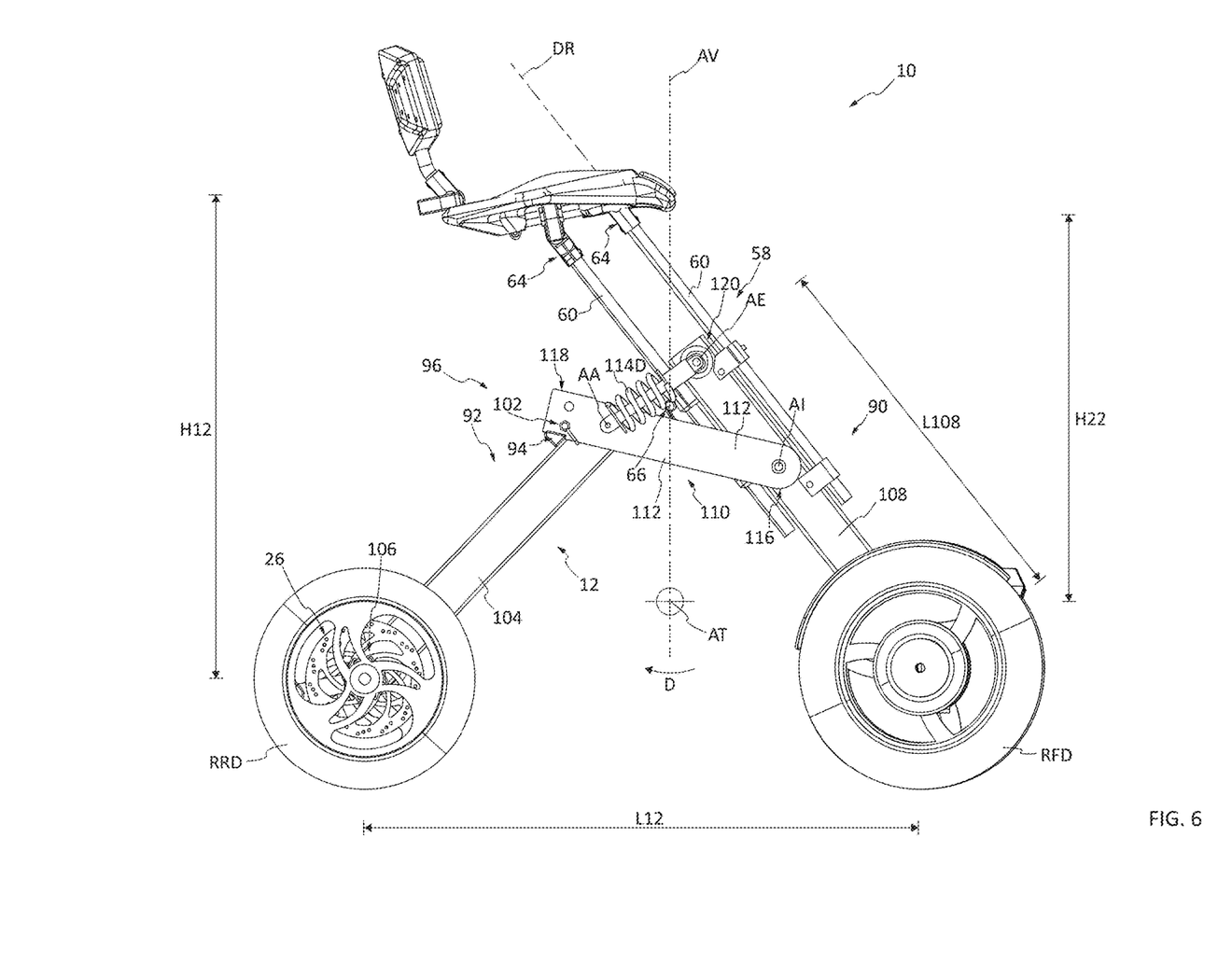
FIG. 6 is a stripped-down side view of the personal vehicle according to the invention, with a second variant of its deployed chassis.

For the purpose of implementing the speed control, and in a preferred embodiment of the invention, each of the right rear RRD and left rear RRG wheels of the set 18 of rear wheels is equipped with braking means 26 that can be seen in FIGS. 5 and 6, with these braking means 26 taking, for example, the form of disk brakes.

Alternatively, the braking of the vehicle 10 can also be accomplished thanks to the electrical drives MD, MG of each of the two right front RFD and left front RFG wheels.

In addition, each pedal PD, PG that is used to control the vehicle in speed is equipped with a sensor measuring its rotation TD, TG around its tilting axis ABD, ABG, with this measurement being used to control in speed each motor driving a wheel and/or to control the braking means 26.

In parallel, the personal vehicle 10 according to the invention also offers a guiding in intuitive and natural direction for most of the potential users.

For this purpose, and according to a significant characteristic of this invention, at least one pedal, a so-called guide pedal, is mounted to rotate in relation to the chassis 12 around a pivoting axis that is essentially parallel to the vertical axis AV of the vehicle's chassis, with a rotation of this guide pedal around its pivoting axis being used to guide the vehicle 10 in a direction.

However, in a preferred embodiment of the invention, the two right PD and left PG pedals are guide pedals, with these two right PD and left PG guide pedals being mounted in rotation LD, LG in relation to the chassis 12 or around right pivoting APD and left pivoting APG axes that are essentially parallel to the vertical axis AV of the chassis 12 or the vehicle 10, and with simultaneous rotations LD, LG of these two right PD and left PG guide pedals around their right pivoting APD and left pivoting APG axes being used for guiding the vehicle 10 in a direction.

As indicated above, these twisting movements of the pedals PD and PG, i.e., of rotation LD and LG from the right to the left around the right pivoting APD and left pivoting APG axes that are essentially vertical, are more natural driving actions.

Actually, a user of the vehicle should simply orient the guide pedal or pedals PD, PG in the direction toward which it is desired to travel with the vehicle.

Of course, to make it possible for the vehicle to change direction when the user makes the guide pedal or pedals PD, PG pivot, at least one set of wheels 14, 18 comprises guide wheels.

In a first variant of the directional means 27 of the vehicle 10 according to the invention, and as FIGS. 1 to 3 and 5 to 7 illustrate, the two right front RFD and left front RFG wheels are guide wheels.

For this purpose, each of these two right front RFD and left front RFG wheels is respectively mounted on a right front PFD and left front PFG hub-carrier, with each of its front hub carriers PFD, PFG being mounted to pivot on the chassis 12 around a hub-carrier axis AFD, AFG that is essentially parallel to the vertical axis AV of the chassis 12.

Next, and so that a rotation LD, LG of a guide pedal PD, PG around its pivoting axis APD, APG brings about a change in orientation of each guide wheel RFD, RFG, each guide pedal PD, PG is connected by an articulated mechanism 28 to each hub-carrier PFD, PFG of each guide wheel RFD, RFG.

In more detail, with each pivoting hub-carrier PFD and PFG comprising a lever arm BFD, BFG extending perpendicularly to the corresponding hub-carrier axis AFD, AFG and each guide pedal PD, PG comprising a guide arm 30D, 30G extending perpendicularly to its pivoting axis APD, APG, the guide arm 30D, 30G of each guide pedal PD, PG is connected to the lever arm BFD, BFG of each pivoting hub-carrier PFD, PFG by articulated connecting rods.

With the two right PD and left PG pedals preferably being guide pedals, a first right front connecting rod 32FD connects the lever arm BFD of the right front hub-carrier PFD to the guide arm 30D of the right pedal PD, a second left front connecting rod 32FG connects the lever arm BFG of the left front hub-carrier PFG to the guide arm 30G of the left pedal PG, and a third center connecting rod 34F connects the guide arm 30D of the right pedal PD to the guide arm 30G of the left pedal PG.

Preferably, the connections L1, L2, L3, L4 of the three connecting rods 32FD, 32FG, 34F to the different arms BFD, BFG, 30D, 30G are articulated connections around shafts D1, D2, D3, D4 that are essentially parallel to the vertical axis AV of the chassis 12.

Therefore, these connecting rods 32FD, 32FG, 34F and, in a general manner, all of the components of the directional articulated mechanism 28 are preferably articulated in an articulation plane PA that is essentially perpendicular to the vertical axis AV of the chassis 12.

Always preferably, the second connection L2 groups the articulated connection of the right front connecting link 32FD with the guide arm 30D of the right pedal PD and the articulated connection of the center connecting rod 34F with the guide arm 30D of the right pedal PD, and the third connection L3 groups the articulated connection of the left front connecting rod 32FG with the guide arm 30D of the right pedal PD and the articulated connection of the central connecting rod 34F with the guide arm 30D of the right pedal PD.

In this first variant of the directional means 27, the different components of the articulated mechanism 28: connecting rods 32FD, 32FG, 34F, lever arm BFD, BFG and the guide arm 30D, 30G are located at the front 16 of the chassis 12, under this chassis 12, and between the two guide front wheels RFD, RFG.

Figure 4:
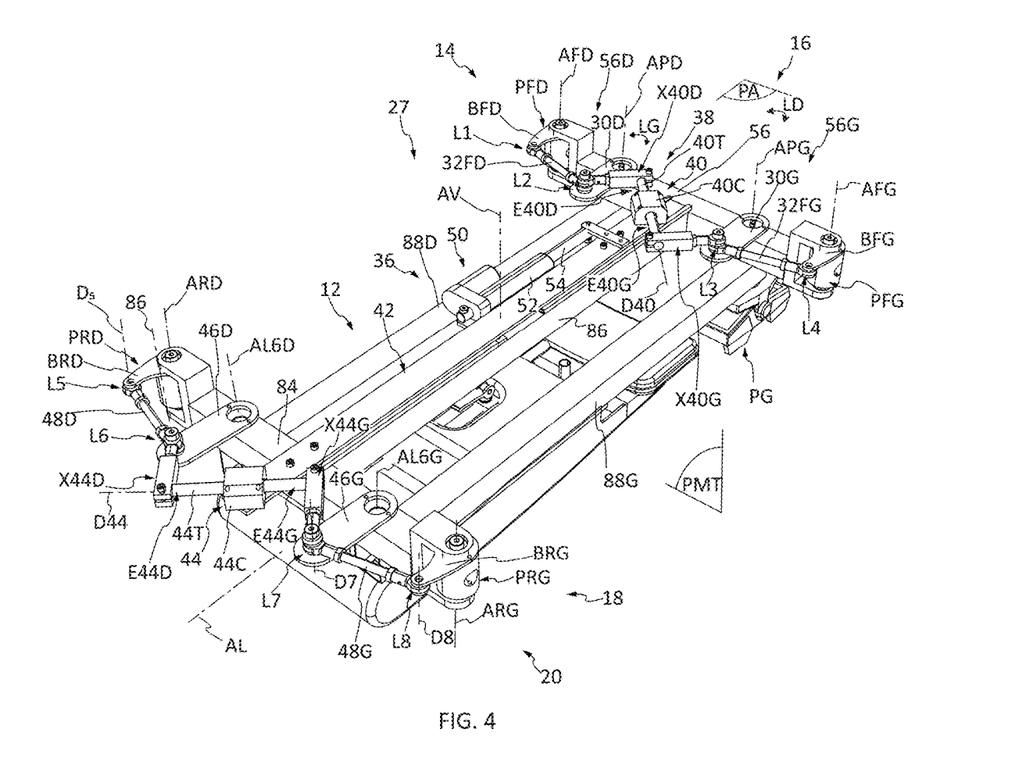
FIG. 4 is a bottom perspective view of a second variant of the directional means of the personal vehicle according to the invention, with a first variant of its chassis.

In a second variant of the directional means 27 of the vehicle 10 according to the invention that makes it possible to reduce the steering radius of the vehicle, and as FIGS. 4, 8 and 9 illustrate, the four right front RFD, left front RFG, right rear RRD and left rear RRG wheels are guide wheels.

For this purpose, each of these right front RFD, left front RFG, right rear RRD and left rear RRG wheels is respectively mounted on a right front PFD, left front PFG, right rear PRD and left rear PRG hub-carrier, with each of its front and rear hub-carriers PFD, PFG, PRD, PRG being mounted to pivot on the chassis 12 around a hub-carrier axis AFD, AFG, ARD, ARG that is essentially parallel to the vertical axis AV of the chassis 12.

Next, and so that a rotation LD, LG of a guide pedal PD, PG around its pivoting axis APD, APG brings about a change in orientation of each guide wheel RFD, RFG, RRD, RRG, each guide pedal PD, PG is connected by an articulated mechanism 36 to each hub-carrier PFD, PFG, PRD, PRG of each guide wheel RFD, RFG, RRD, RRG.

In more detail, with each pivoting hub-carrier PFD, PFG, PRD, PRG comprising a lever arm BFD, BFG, BRD, BRG extending perpendicularly to the corresponding hub-carrier axis AFD, AFG, ARD, ARG, and each guide pedal PD, PG comprising a guide arm 30D, 30G extending perpendicularly to its pivoting axis APD, APG, the guide arm 30D, 30G of each guide pedal PD, PG is connected to the lever arm BFD, BFG, BRD, BRG of each pivoting hub-carrier PFD, PFG, PRD, PRG by articulated connecting rods and by an articulated central device.

With the two right PD and left PG pedals preferably being guide pedals, a first right front connecting rod 32FD connects the lever arm BFD of the right front hub-carrier PFD to the guide arm 30D of the right pedal PD, a second left front connecting rod 32FG connects the lever arm BFG of the left front hub-carrier PFG to the guide arm 30G of the left pedal PG, and the articulated central device 38 connects the lever arms BRD, BRG of each rear hub-carrier PRD, PRG to the guide arms 30D, 30G of the guide pedals PD, PG.

In this second variant of the directional means 27, the articulated central device 38 is substituted structurally with the center connecting rod 34F of the first variant of the directional means 27, and more particularly within the second and third connections L2, L3, with the first and fourth connections L1, L4 remaining identical.

Also, and in addition to participating in the transmission of the rotational movement LD, LG of each guide pedal PD, PG toward the hub-carriers PFD, PFG of the front wheels RFD, RFG, this articulated central device 38 makes it possible to shift the rotational movement LD, LG of each guide pedal PD, PG toward the hub-carriers PRD, PRG of the rear wheels RRD, RRG.

For this purpose, and guide pedals PD, PG toward the hub-carriers PRD, PRG of the rear wheels RRD, RRG, this articulated central device 38 comprises a front linear sleeve 40, a slide 42, a rear linear sleeve 44, two right 46D and left 46G auxiliary guide arms, and two right 48D and left 48G rear articulated connecting rods.

Each linear sleeve 40, 44 comprises a body 40C, 44C that is attached to the slide 42 and a rod 40T, 44T that slides in relation to this body.

At each of its right E40D, E44D and left E40G, E44G ends, each rod 40T, 44T of each linear sleeve 40, 44 comprises right X40D, X44D and left X40G, X44G stationary extensions extending perpendicularly to the longitudinal direction D40, D44 of this rod, with the two right X40D, X44D and left X40G, X44G stationary extensions of each rod 40T, 44T extending in opposite directions.

Structurally, the right X40D and left X40G stationary extensions respectively connect the guide arms 30D, 30G to the rod 40T of the front linear sleeve 40, the body 40C of the front linear sleeve 40 connects the front rod 40T of this sleeve to the slide 42, the slide 42 connects the body 40C of the front linear sleeve 40 to the body 44C of the rear linear sleeve 44, the body 44C of the rear linear sleeve 44 connects the slide 42 to the rod 44T of this sleeve, the right X44D and left X44G stationary extensions respectively connect the right 46D and left 46G auxiliary guide arms to the rod 44T of the rear linear sleeve 44, and the two right 48D and left 48G rear articulated connecting rods respectively connect the right 46D and left 46G auxiliary guide arms to the right BRD and left BRG lever arms of the rear hub-carriers PRD, PRG.

Kinematically, the slide 42 is mounted to slide in relation to the chassis 12 in the longitudinal axis AL of this chassis, for example using pads and guide rails, and the respective sliding directions D40 and D44 of the rods 40T, 44T of the front 40 and rear 44 linear sleeves are perpendicular in relation to one another, and each one is inclined by 45° in relation to the direction of the longitudinal axis AL of the chassis 12.

Also, the front 40 and rear 44 linear sleeves are mounted on the slide 42 symmetrically to a transverse median plane PMT that is parallel to the transverse axis AT of the chassis 12 and perpendicular to the longitudinal axis AL of this chassis.

Preferably, and always from the kinematic standpoint, the right 46D and left 46G auxiliary guide arms are respectively mounted to pivot in relation to the chassis 12 around right A46D and left A46G pivoting axes that are essentially parallel to the vertical axis AV of the chassis 12, and the connections L5, L6, L7, L8 between the articulated connecting rods 48D, 48G and these guide arms 46D, 46G and the extensions X44D, X44G are articulated connections around axes D5, D6, D7, D8 that are essentially parallel to the vertical axis AV of the chassis 12.

Therefore, the connecting rods 48D, 48G, and in a general manner all of the components of the directional articulated mechanism 36, are preferably articulated in an articulation plane PA that is perpendicular to the vertical axis AV of the chassis 12.

Always preferably, the sixth connection L6 groups the articulated connection of the right rear connecting rod 48D with the right auxiliary guide arm 46D and the articulated connection of the right extension X44D of the rear sleeve 44 with the right auxiliary guide arm 46D, and the seventh connection L7 groups the articulated connection of the left rear connecting rod 48G with the left auxiliary guide arm 46G and the articulated connection of the left extension X44G of the rear sleeve 44 with the left auxiliary guide arm 46G.

In this second variant of the directional means 27, the various components of the articulated mechanism 36 are also located under the chassis 12.

In addition, the connecting rods 32FD, 32FG, the front linear sleeve 40, the guide arms 30D, 30G, and the lever arms BFD, BFG are located at the front 16 of the chassis 12, between the two guide front wheels RFD, RFG.

The rear linear sleeve 44, the connecting rods 48D, 48G, the auxiliary guide arms 46D, 46G and the lever arms BRD, BRG are located at the rear 20 of the chassis 12, between the two guide rear wheels RRD, RRG.

And, the slide 42 is also mounted under the chassis 12, between the front 16 and the rear 20 of the chassis 12, in such a way as to carry out the mechanical connection between the front linear sleeve 40 and the rear linear sleeve 44.

In addition, and in one or the other of the two variant embodiments of the directional means 27, the articulated mechanism 28, 36 can be equipped with a jack 50 for assistance in changing direction, this assistance jack 50 comprising a body 52 that is attached to the chassis 12 of the vehicle and a rod 54 that is connected to the movable element of the articulated mechanism 28, 36.

Advantageously, the operation of this assistance jack 50 is controlled using at least one sensor (not shown in the figures) measuring the rotation LD, LG of at least one guide pedal PD, PG in relation to the chassis 12.

Alternatively to this jack 50, the assistance to the changing in direction can be achieved by sending different speed commands to the electrical drives MD, MG of each of the two right front RFD and left front RFG wheels.

In the second variant embodiment of the directional means 27, and as illustrated by FIG. 4, the rod 54 of the assistance jack 50 is preferably attached to the slide 42.

According to another characteristic of the vehicle 10 whose purpose is to improve the comfort of the user and to facilitate the guiding in a direction and the controlling in speed of the vehicle 10, and knowing that the seat 22 is essentially provided in the central position in the width W12 and in the length L12 of the chassis 12, the two right PD and left PG pedals are mounted at the front 16 of the chassis 12.

In more detail, the two right PD and left PG pedals are mounted side by side on the chassis 12 of the vehicle, between the two right RFD and left RFG wheels of the front set 14 of wheels.

Even more specifically, with the chassis 12 comprising a front crosspiece 56 at the right 56D and left 56G ends of which are respectively mounted the right front RFD and left front RFG wheels, the two right PD and left PG pedals are mounted side by side on this front crosspiece 56.

As indicated above, this positioning of the pedals PD, PG in front of the seat 22 makes it possible for the user to be in a seated-standing position with the legs forward.

Seated-standing position is defined by the invention as a position halfway between a classic seated position, with the thighs perpendicular to the torso, and a standing position.

This seated-standing driving position, seen in FIG. 9, is comfortable for the user who can travel by having his head at the same height as pedestrians around him.

In addition, this seated-standing driving position with the legs forward makes it possible for the user to better support himself in the vehicle during each deceleration.

For the purpose of making it possible for users having different morphologies to use the vehicle 10 with a seated-standing position that is suited to their morphologies, the vehicle 10 comprises means 58 for adjusting the height H22 of the seat 22 in relation to the pedals PD, PG.

As FIGS. 2 and 6 illustrate, these adjustment means 58 take the form of means making it possible to adjust the position of the seat 22 along the vertical axis AV of the chassis 12.

These adjustment means 58, for example, take the form of tubes 60 mounted to slide in relation to the chassis 12, with the seat 22 being attached at the upper ends 64 of these tubes 60.

Of course, means 66 for stopping the motion of the tubes 60 in relation to the chassis 12 so as to lock the position of the seat 22 are also provided, with these stopping means 66 operating by, for example, clamping the tubes 60.

Advantageously, and always so as to adapt the position of the seat 22 in relation to the chassis 12 based on the morphology of the user, these adjustment means 58 also make it possible to adjust the position of the seat 22 along the longitudinal axis AL of the chassis 12.

More specifically, the adjustment means 58 make it possible to simultaneously adjust the position of the seat 22 along the vertical axis AV and the longitudinal axis AL of the chassis 12.

Actually, with the invention providing two variant embodiments of the chassis 12, in these two variants, the tubes 60 slide in an inclined adjustment direction DR in relation to the vertical axis AV of the chassis 12.

In the first variant embodiment of the chassis 12 illustrated by FIGS. 1 to 4 and 8 and 9, with the chassis 12 being monolithic, the seat 22 can be folded toward the chassis to reduce the bulkiness of the vehicle 10, as FIG. 8 shows more particularly.

In this first variant, the tubes 60 are mounted to slide on a rotary support 68.

In more detail, this support 68 is mounted in rotation R68 around an axis of rotation A68 that is essentially perpendicular to the vertical axis AV and provided at the rear 20 of the chassis 12.

Also, means 70 for stopping the rotation R68 of the rotary support 68 around its axis of rotation A68 are provided.

These stopping means 70 take the form of, for example, right 72D and left 72G counter-threads connecting the rotary support 68 to the chassis 12 in parallel to the rotary connection of this support 68 to the chassis 12.

The upper ends 74 of these right 72D and left 72G counter-threads are articulated to the support 68 around a counter-thread axis AC that is separate from the axis of rotation A68 of the rotary support 68.

The lower ends 76 of these right 72D and left 72G counter-threads are articulated to right 78D and left 78G pads that are mounted in translation T78 essentially along the longitudinal axis AL on right 80D and left 80G rails that are provided the chassis 12.

So as to lock the rotation R68 of the rotary support 68, means 82 for stopping the motion T78 of the pads 78D, 78G are provided.

These stopping means 82, operating by, for example, clamping, can preferably be actuated manually.

Thus, by regulating the stopping position of the pads 78D, 78G on the rails 80D, 80G, the user can regulate the slope of the support 68 in relation to the chassis 12 and therefore the slope of the adjustment direction DR along which the tubes 60 slide.

So as to make it more comfortable for the user, the right 72D and left 72G counter-threads can integrate a damping device.

In this first variant, the chassis 12 comprises a front crosspiece 56 and a rear crosspiece 84 connected by three spars: a central spar 86 and two right 88D and left 88G lateral spars.

As FIG. 4 shows, the auxiliary guide arms 46D, 46G are mounted under the rear crosspiece 84, while the slide 42 is mounted under the central spar 86.

In addition, the right 80D and left 80G rails are respectively mounted on the right 88D and left 88G lateral spars.

Always with a view to reducing the bulkiness of the vehicle 10 when it is not used, and always in this first variant embodiment of the chassis 12, the base 89 of the seat 22 can be folded back against the seatback 91 thereof.

Figure 7:
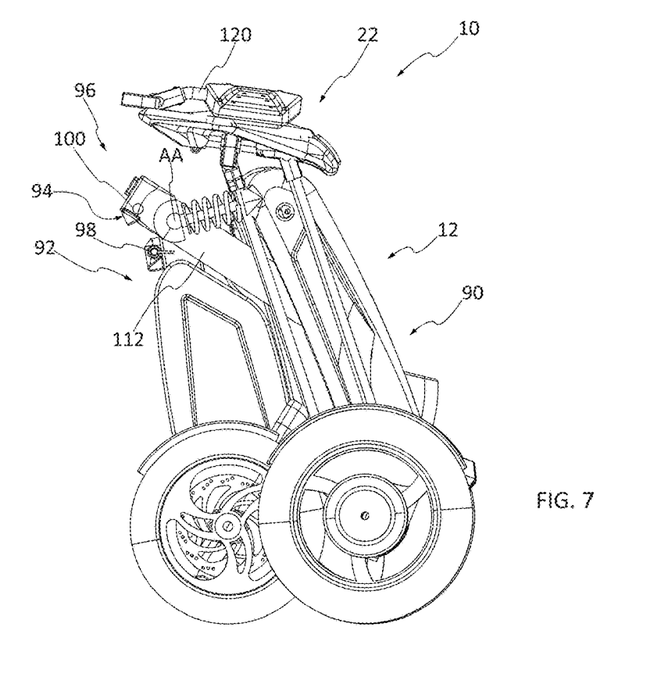
FIG. 7 is a side view of the personal vehicle according to the invention, with a second variant of its folded chassis.

In a second variant embodiment illustrated by FIGS. 5 to 7, the chassis 12 comprises two front 90 and rear 92 parts that are articulated to one another around an axis of articulation AA that is perpendicular to the vertical axis AV of the chassis 12.

This articulation between the front 90 and rear 92 parts makes it possible to reduce the bulkiness of the vehicle 10 when it is not used by bringing together the front set of wheels 14 and the rear set of wheels 18, as FIG. 7 illustrates.

For the purpose of using the vehicle 10, a stop 94 is provided that stops the deployment D of the rear part 92 in relation to the front part 90 and a mechanism 96 for locking this stop.

In the example illustrated in FIG. 6, the stop 94 is carried by the front part 90.

In parallel, the locking mechanism 96 comprises a bore 98 that passes through the rear part 92, a bore 100 that passes through the front part 90, and a locking shaft 102 inserted into these bores 98, 100 that are coaxial when the rear part 92 rests against the stop 94.

Preferably, the locking shaft 102 can be actuated by manual clamping.

In this second variant embodiment of the chassis 12, the rear part 92 takes the form of a rear beam 104 that is integral with a rear crosspiece 106, with the right rear RRD and left rear RRG wheels being mounted at the ends of this rear crosspiece 106.

With the rear crosspiece 106 extending along the transverse axis AT of the chassis 12, the rear beam 104 extends along the longitudinal axis AL of the chassis and perpendicularly to the rear crosspiece 106.

Always in this second variant embodiment of the chassis 12, the front part 90 is formed by at least one front beam 108 that is integral with the front crosspiece 56 that supports the guide and speed pedals PD, PG and the articulated mechanism 28.

This front beam 108 also extends along the longitudinal axis AL of the chassis and perpendicularly to the front crosspiece 56.

Preferably, the tubes 60 that support the seat 22 are mounted to slide on this front beam 108.

Advantageously, this front part 90 integrates damping means 110 between the front beam 108 and the axis of articulation AA.

These damping means 110 comprise an intermediate beam 112 that is articulated to the front beam 108 around an intermediate axis AI located in the length L108 of the front beam 108 and parallel to the axis of articulation AA, and right 114D and left 114G shock absorbers articulated between this intermediate beam 112 and the front beam 108.

More specifically, with the intermediate axis AI being located at the front end 116 of the intermediate beam 112, and the axis of articulation AA being provided at the rear end 118 of the intermediate beam 112, the right 114D and left 114G shock absorbers are articulated between the axis of articulation AA and an end axis AE located at the upper end 120 of the front beam 108 and parallel to the axis of articulation AA.

Always with a view to reducing the bulkiness of the vehicle 10 when it is not used, and always in this second variant embodiment of the chassis 12, the seatback 120 of the seat 22 can be folded back.

In one or the other of the variant embodiments of the chassis 12, the positioning of the seat 22 on the chassis 12 and relative to the pedals PD, PG offers a driving position that is comfortable for female users wearing dresses or skirts.

Always in one or the other of the variant embodiments of the chassis 12, the different elements that form the chassis 12 and the directional means 27 can be protected by covers, whereby these covers make it possible both to improve the external appearance of the vehicle and to protect the user from moving mechanical parts.

In addition to the pedals PD, PG, the guide means 24 can comprise a control means, such as a switch, making it possible to select the front or rear direction of the vehicle 10.

Preferably, this control means, not illustrated in the figures, is positioned on the chassis 12 of the vehicle 10 at a location that is accessible by a user's hand or by a user's foot, or, for example, beside a pedal PD, PG.

This invention also provides different improvements designed to improve the experience of the user of the personal vehicle 10 according to the invention.

According to a first improvement, the right PD and left PG pedals comprise right 122D and left 112G side walls that rise on either side of the receiving surfaces SD, SG offered by these pedals, as FIG. 8 illustrates.

By improving the hold of the user's feet on the receiving surfaces SD, SG of the pedals, these right 122D and left 122G side walls facilitate the driving of the vehicle.

Figure 10:
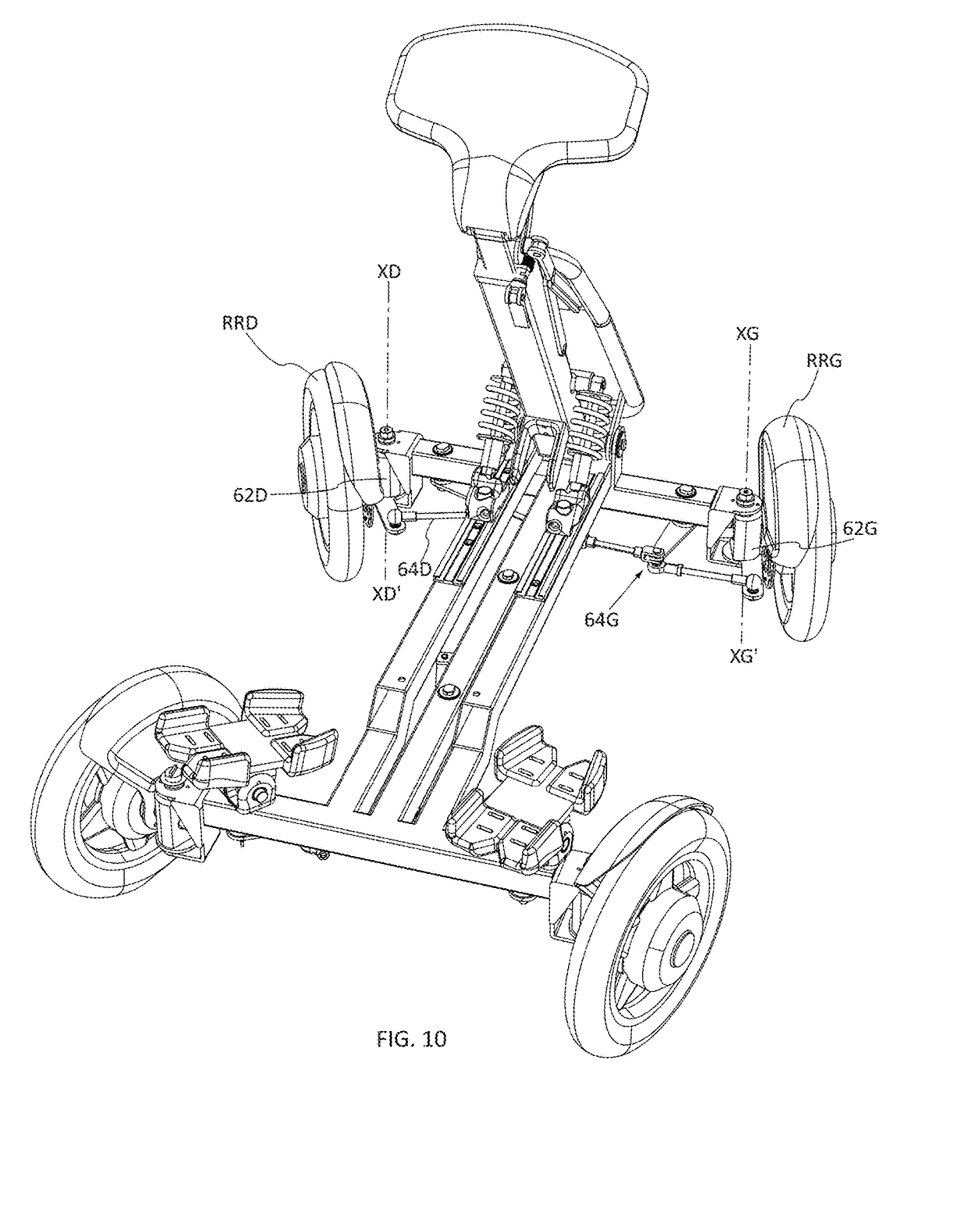
FIG. 10 is a perspective view showing a variant with directional rear wheels.

According to another improvement, a directional front set is provided, but it is possible also to provide simultaneously directional rear wheels RRG and RRG, as is illustrated in FIG. 10. In this case, the rear wheels are mounted to pivot on supports 64D, 64G with axes XDXD' and XGXG' of vertical pivoting.

Sets D64D and 64G of links ensure the transmission of the rotational movement to the wheels starting from a connection also by links with the guide arms 30. The rotation is reversed so that the wheels follow the same curve. Thus, when the right front wheel turns right, the right rear wheel turns left as shown in the drawing.

The handling is also enhanced, and the rotation of the vehicle is performed in an extremely flexible way. In addition, the tire treads are less subject to friction.

According to another improvement, the rear set of wheels 18 can be equipped with right 124D and left 124G platforms that make it possible for an individual to stand upright behind the user who is installed on the seat 22.

Finally, and based on the use of the personal vehicle 10, it can be provided to equip the vehicle 10 with advertising supports 126 and/or with a support 128 for a touch screen tablet.

The invention claimed is:

1. A foot-operated personal vehicle (10), comprising:
a chassis (12) having a length (L12) that extends along a longitudinal axis (AL), a width (W12) extending along a transverse axis (AT), and a height (H12) extending along a vertical axis (AV);
a front set (14) of wheels mounted at a front (16) of the chassis;
a rear set (18) of wheels mounted at a rear (20) of the chassis;
a seat (22) mounted on the chassis;
at least one motor that drives in rotation at least one wheel of at least one of the front and rear sets of wheels;
means (24) for controlling a speed of the vehicle (10) and for guiding the vehicle (10) in a direction of travel, comprising right (PD) and left (PG) pedals, each of said left and right pedals having a surface for accommodating a user's feet,
at least one of said pedals constituting a speed pedal that is mounted to rotate in relation to the chassis (12) around a tilting axis that is perpendicular to the vertical axis (AV) of the chassis (12), a rotation of the speed pedal around the tilting axis configured to control a speed of the vehicle (10), and
at least one of said pedals constituting a guide pedal mounted to rotate in relation to the chassis (12) around a pivoting axis that is parallel to the vertical axis (AV) of the chassis (12), whereby a rotation of the guide pedal around the pivoting axis is configured to guide the direction of travel of the vehicle (10).

2. The foot-operated personal vehicle (10) according to claim 1, wherein the seat (22) is located in a central position in the width (W12) and in the length (L12) of the chassis (12), the right (PD) and left (PG) pedals are mounted at the front (16) of the chassis (12).

3. The foot-operated personal vehicle (10) according to claim 2, wherein the right (PD) and left (PG) pedals are mounted side by side on the chassis (12), between the front set (14) of wheels.

4. The foot-operated personal vehicle (10) according to claim 3, wherein the chassis (12) includes a front crosspiece (56), a right end of the front crosspiece having a right front wheel (RFD) of the front set of wheels mounted thereon and a left end of the front crosspiece having a left front wheel (RFG) of the front set of wheels mounted thereon, the right (PD) and left (PG) pedals being mounted side by side on the front crosspiece (56).

5. The foot-operated personal vehicle (10) according to claim 1, wherein at least one of said front set of wheels and said rear set of wheels constitute guide wheels, each of said guide wheels being mounted on a hub-carrier axis pivotably mounted on the chassis (12) to pivot around each respective hub-carrier axis of each said guide wheel that is parallel to the vertical axis (AV) of the chassis (12),
each guide pedal being connected by an articulated mechanism to a hub-carrier of each guide wheel in such a way that a rotation of the guide pedal around the pivoting axis causes a change in orientation of each guide wheel.

6. The foot-operated personal vehicle (10) according to claim 5, wherein the front set of wheels constitute said guide wheels, each pivoting hub-carrier comprising a lever arm extending perpendicularly to the corresponding hub-carrier axis, and said guide pedal comprising a guide arm extending perpendicularly to the pivoting axis, the guide arm of each guide pedal connected to the lever arm of each pivoting hub-carrier by articulated connecting rods.

7. The foot-operated personal vehicle (10) according to claim 5, wherein both the front set of wheels and the rear set of wheels constitute the guide wheels, each pivoting hub-carrier comprising a lever arm extending perpendicularly to the corresponding hub-carrier axis, and the guide pedal comprising a guide arm extending perpendicularly to the pivoting axis, the guide arm of the guide pedal connected to the lever arm of each pivoting hub-carrier by articulated connecting rods and by an articulated central device (38).

8. The foot-operated personal vehicle (10) according to claim 5, wherein the articulated mechanism is equipped with an assistance jack (50) that assists in changing the direction of travel of the vehicle, the assistance jack (50) comprising a body (52) that is attached to the chassis (12) and a rod (54) that is connected to a movable element (42) of the articulated mechanism.

9. The foot-operated personal vehicle (10) according to claim 1, wherein the right (PD) and left (PG) pedals are guide pedals, the right guide (PD) and left guide (PG) pedals being mounted to rotate in relation to the chassis (12) respectively around a right pivoting axis (APD) and a left pivoting axis (APG) that are parallel to the vertical axis (AV) of the chassis (12), and whereby simultaneous rotations of the right (PD) and left (PG) guide pedals around the respective right pivoting axis (APD) and the left pivoting axis (APG) are configured to guide the vehicle (10) in a direction.

10. The foot-operated personal vehicle (10) according to claim 1, wherein the right (PD) and left (PG) pedals are speed pedals, the right (PD) and left (PG) speed pedals being mounted to rotate in relation to the chassis (12) respectively around a right tilting (ABD) and a left tilting (ABG) axes that are perpendicular to the vertical axis (AV) of the chassis (12), and whereby a rotation (TD) of the right pedal (PD)

around the right tilting axis (ABD) is configured to increase the speed of the vehicle (10), and a rotation (TG) of the left pedal (PG) around the left tilting axis (ABG) is configured to reduce the speed of the vehicle (10).

11. The foot-operated personal vehicle (10) according to claim 1, further comprising:
    guide rear wheels (RRD, RRG).

12. The foot-operated personal vehicle (10) according to claim 1, further comprising:
    adjustment means (58) for adjusting a height (H22) of the seat (22) in relation to the pedals.

13. The foot-operated personal vehicle (10) according to claim 12, wherein the adjustment means (58) is configured to adjust a position of the seat (22) along the longitudinal axis (AL) of the chassis (12).

14. The foot-operated personal vehicle (10) according to claim 1, wherein the chassis (12) of the vehicle (10) comprises front (90) and rear (92) parts that are articulated to one another around an axis of articulation (AA) that is perpendicular to the vertical axis (AV) of the chassis (12).

15. The foot-operated personal vehicle (10) according to claim 1, wherein the chassis (12) is monolithic, and the seat (22) is configured to fold toward the chassis to reduce the bulkiness of the vehicle (10).

16. The foot-operated personal vehicle (10) according to claim 2, wherein at least one of said front set of wheels and said rear set of wheels constitute guide wheels, each of said guide wheels being mounted on a hub-carrier axis pivotably mounted on the chassis (12) to pivot around each respective hub-carrier axis of each said guide wheel that is parallel to the vertical axis (AV) of the chassis (12),
    each guide pedal being connected by an articulated mechanism to a hub-carrier of each guide wheel in such a way that a rotation of the guide pedal around the pivoting axis causes a change in orientation of each guide wheel.

17. The foot-operated personal vehicle (10) according to claim 3, wherein at least one of said front set of wheels and said rear set of wheels constitute guide wheels, each of said guide wheels being mounted on a hub-carrier axis pivotably mounted on the chassis (12) to pivot around each respective hub-carrier axis of each said guide wheel that is parallel to the vertical axis (AV) of the chassis (12),
    each guide pedal being connected by an articulated mechanism to a hub-carrier of each guide wheel in such a way that a rotation of the guide pedal around the pivoting axis causes a change in orientation of each guide wheel.

18. The foot-operated personal vehicle (10) according to claim 4, wherein at least one of said front set of wheels and said rear set of wheels constitute guide wheels, each of said guide wheels being mounted on a hub-carrier axis pivotably mounted on the chassis (12) to pivot around each respective hub-carrier axis of each said guide wheel that is parallel to the vertical axis (AV) of the chassis (12),
    each guide pedal being connected by an articulated mechanism to a hub-carrier of each guide wheel in such a way that a rotation of the guide pedal around the pivoting axis causes a change in orientation of each guide wheel.

19. The foot-operated personal vehicle (10) according to claim 6, wherein the articulated mechanism is equipped with an assistance jack (50) that assists in changing the direction of travel of the vehicle, the assistance jack (50) comprising a body (52) that is attached to the chassis (12) and a rod (54) that is connected to a movable element (42) of the articulated mechanism.

20. The foot-operated personal vehicle (10) according to claim 9, wherein the right (PD) and left (PG) pedals also operate as speed pedals, the right (PD) and left (PG) pedals being mounted to rotate in relation to the chassis (12) respectively around a right tilting (ABD) and a left tilting (ABG) axes that are each perpendicular to the vertical axis (AV) of the chassis (12), and whereby a rotation (TD) of the right pedal about the right tilting axis increases the speed of the vehicle (10), and a rotation (TG) of a second of the left pedal about the left tilting axis reduces the speed of the vehicle (10).

\* \* \* \* \*